United States Patent
Adari

(10) Patent No.: US 10,156,263 B2
(45) Date of Patent: Dec. 18, 2018

(54) TORQUE CONVERTER DAMPER ASSEMBLY AND METHOD OF ASSEMBLING COVER PLATE AND SPRINGS INTO SPRING RETAINER

(71) Applicant: Schaeffler Technologies AG & Co. KG, Herzogenaurach (DE)

(72) Inventor: Sagar Adari, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 340 days.

(21) Appl. No.: 14/948,665

(22) Filed: Nov. 23, 2015

(65) Prior Publication Data

US 2017/0146071 A1    May 25, 2017

(51) Int. Cl.

| F16D 33/00 | (2006.01) |
| F16D 3/12  | (2006.01) |
| F16H 45/02 | (2006.01) |
| F16F 15/00 | (2006.01) |
| F16H 41/24 | (2006.01) |

(52) U.S. Cl.
CPC ............ *F16D 3/12* (2013.01); *F16F 15/00* (2013.01); *F16H 41/24* (2013.01); *F16H 45/02* (2013.01); *F16D 2250/0084* (2013.01); *F16D 2300/12* (2013.01); *F16H 2045/0221* (2013.01); *F16H 2045/0231* (2013.01); *F16H 2045/0278* (2013.01)

(58) Field of Classification Search
CPC ................ F16H 2045/0221; F16H 2045/0247
USPC .......................................................... 60/338
See application file for complete search history.

(56) References Cited

U.S. PATENT DOCUMENTS

| 5,105,921 A   | 4/1992 | Fujimoto |
| 8,205,731 B2* | 6/2012 | Maeda .............. F16H 45/02 |
|               |        | 192/3.29 |

* cited by examiner

*Primary Examiner* — Michael Leslie
(74) *Attorney, Agent, or Firm* — Davidson, Davidson & Kappel, LLC

(57) ABSTRACT

A method of forming a damper assembly is provided. The method includes providing springs into an interior space of a spring retainer such that the springs circumferentially contact carrier pins; compressing the springs via the carrier pins into a preloaded orientation; providing tabs in the interior space of the spring retainer such that each of the tabs is between two of the carrier pins; and removing the carrier pins such that the tabs hold the springs in the preloaded orientation. A damper assembly and a torque converter are also provided.

12 Claims, 3 Drawing Sheets

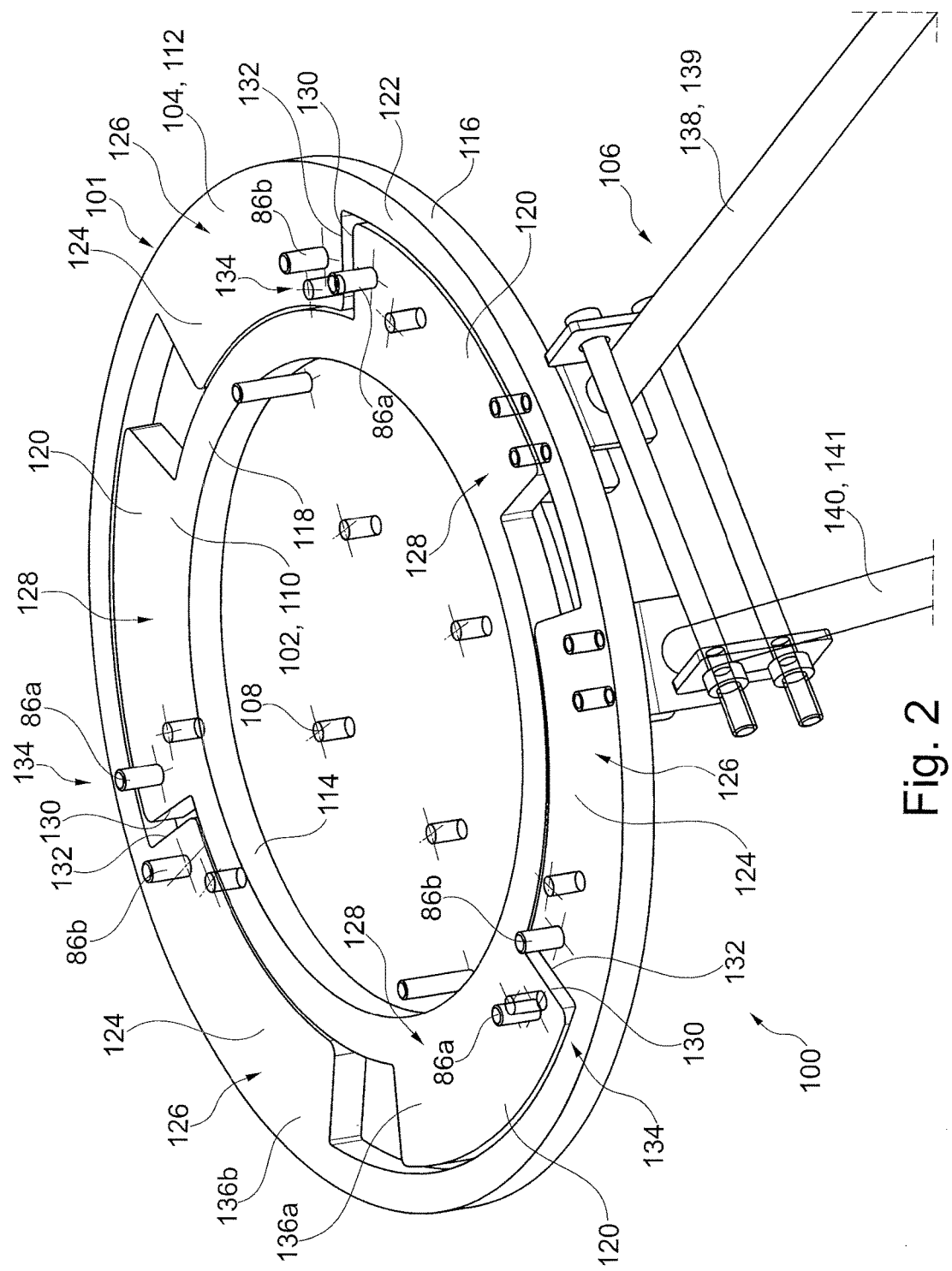

TORQUE CONVERTER DAMPER ASSEMBLY AND METHOD OF ASSEMBLING COVER PLATE AND SPRINGS INTO SPRING RETAINER

The present disclosure relates generally to torque converters and more specifically to torque converter damper assemblies.

BACKGROUND

U.S. Pat. No. 5,105,921 discloses a torque converter including a damper assembly having a spring retainer design installed within a piston rim.

SUMMARY OF THE INVENTION

A method of forming a damper assembly is provided. The method includes providing springs into an interior space of a spring retainer such that the springs circumferentially contact carrier pins; compressing the springs via the carrier pins into a preloaded orientation; providing tabs in the interior space of the spring retainer such that each of the tabs is between two of the carrier pins; and removing the carrier pins such that the tabs hold the springs in the preloaded orientation.

A damper assembly for a torque converter is also provided. The damper assembly includes a spring retainer including an interior space holding springs and tabs extending radially into spaces circumferentially between the springs and preloading the springs. The spring retainer includes elongated slots extending circumferentially therein. The elongated slots are circumferentially aligned with the springs.

A torque converter is also provided. The torque converter includes the damper assembly and a turbine connected to the damper assembly.

BRIEF DESCRIPTION OF THE DRAWINGS

The present invention is described below by reference to the following drawings, in which:

FIG. 2 shows a tool configured for use in assembling the damper assembly shown in FIG. 1.

DETAILED DESCRIPTION

The disclosure provides a torque converter damper assembly including carrier pins on a mechanism on the assembly palette on which all the damper components are assembled, thus enabling the damper assembly to be assembled without an operator having to preload springs. Prior to assembly of the cover plate, the carrier pins travel in the slots via a mechanism on the carrier to wind the springs and make space for the cover plate to be assembled easily. The mechanism includes two concentric discs with three pins on each disc which sit adjacent to the pins on the other ring. Each of the discs are connected to a respective handle bar which is operated by its respective pneumatic cylinder causing the discs to rotate in opposite direction and separate the pins.

Figure 1:
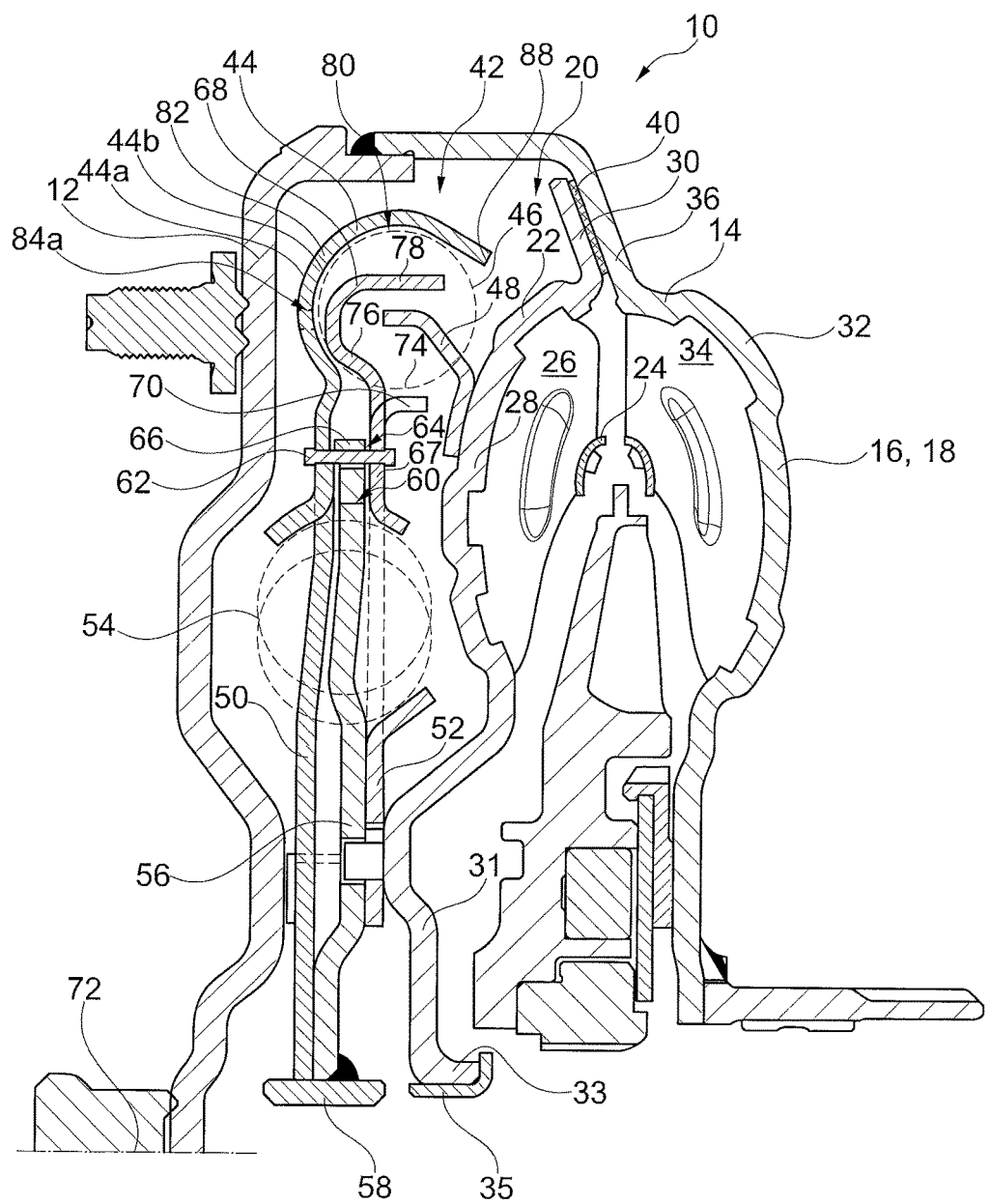
FIG. 1 schematically shows a cross-sectional side view of a torque converter in accordance with an embodiment of the present invention.

FIG. 1 shows a cross-sectional side view of a torque converter 10 in accordance with an embodiment of the present invention. Torque converter 10 includes a front cover 12 for connecting to a crankshaft of an internal combustion engine and a rear cover 14 forming a shell 16 of an impeller or pump 18. Torque converter 10 also includes a turbine 20 that is configured such that turbine 20 is axially moveable toward and away from impeller 18 to engage and disengage impeller 18 so as to form a lockup clutch. Turbine 20 includes a turbine shell 22 and an inner ring 24 supporting a plurality of turbine blades 26 therebetween. Turbine shell 22 includes a rounded blade supporting portion 28 for supporting of turbine blades 26 at a front cover side of the blades 26. Radially outside of blade supporting portion 28, turbine shell 22 includes an outer radial extension 30 radially protruding outwardly from an outer circumference of blade supporting portion 28. Radially inside of blade supporting portion 28, turbine shell 22 includes an inner radial extension 31 that, at an inner radial end thereof, joins an axially extending inner circumferential section 33, whose inner circumferential surface contacts an outer circumferential surface of a hub 35. Impeller shell 16 includes a rounded blade supporting portion 32 for supporting a plurality of impeller blades 34. Radially outside of blade supporting portion 32, impeller shell 16 includes a radially extending wall 36 radially protruding outwardly from an outer circumference of rounded blade supporting portion 32.

A friction material 40 is bonded onto a surface of outer radial extension 30 for engaging radially extending wall 36. In other embodiments, instead of or in addition to being bonded to outer radial extension 30, friction material 40 may be bonded to radially extending wall 36. A damper assembly 42 is positioned between front cover 12 and turbine 20 and is configured for transferring torque from turbine 20 to a transmission input shaft. Damper assembly 42 includes a spring retainer 44 retaining a plurality of arc springs 46 at a radial outer end of damper 26. Spring retainer 44 is driven by drive tabs 48 fixed to a front cover side of blade supporting portion 28. Drive tabs 48 circumferentially drivingly engage damper assembly 42 via springs 46 by extending into spaces circumferentially between arc springs 46. Spring retainer 44 is formed at a radially outer end of a front-cover side cover plate 50. Damper assembly 42 further includes a turbine side cover plate 52. Cover plates 50, 52 support an inner set of arc springs 54 axially therebetween. Damper assembly 42 also includes a drive flange 56 positioned axially between cover plate 50, 52. Drive flange 56 includes an inner radial hub 58 configured for nonrotatably connecting to a transmission input shaft. Drive flange 56 further includes circumferentially extending slots 60 for receiving springs 54. Radially outside of springs 54, cover plates 50, 52 are fixed together by a plurality of circumferentially spaced rivets 62. Rivets 62 pass through cover plates 50, 52 into circumferential spaces 64 formed between outer tabs 66 extending from a radial outer end of drive flange 56.

Outer radial extension 30 of turbine 20 engages impeller 18 at radially extending wall 36 via friction material 40 to transfer torque input into front cover 20 by the engine crankshaft to the transmission input shaft. As turbine 20 is driven by impeller 18, either through contact via friction material 40 and impeller shell 16 when the lockup clutch is locked or through fluid flow between blades 26, 34, turbine 20 transfers torque to damper assembly 42 via drive tabs 48. Cover plates 50, 52 transfer torque from turbine 20 to drive flange via springs 54. Drive flange 56 in turn drives the transmission input shaft.

At a radial outer end of a base section 67 thereof, which supports springs 54, cover plate 52 splits into a plurality of circumferentially spaced tabs 68 forming positioning stops for springs 46 and into a spring support ring 70. Spring support ring 70 is positioned radially inside of tabs 68 and extends about a center axis 72 of torque converter 10 and damper assembly 42. Spring support ring 70 is positioned adjacent to a radially inner edge 74 of an outer circumference of each of springs 46. Spring support ring 70 is split into a plurality of circumferentially spaced sections, with each section extending along a radially inner edge 74 of the outer circumference of one of springs 46. Sections of ring 70 are circumferential offset from and between tabs 68, with each tab 68 being between two of the sections of ring 70. Spring support ring 70 extends axially away from base section 67 toward turbine 20. Tabs 68 extend into an interior space 80 of spring retainer 44, which houses springs 46, circumferentially between springs 46. Tabs 68 each include a radially extending section 76 extending radially outward from base section 67 and an axially extending section 78 extending axially from a radially outer end of radially extending section 76.

Spring retainer 44 extends from axial free end 88 in an arcuate path, first radially outward and then radially inward, to form rounded radially extending section 82. Rounded radially extending section 82 of spring retainer 44 is provided with a plurality of elongated slots 84a, 84b extending axially therethrough from an exterior surface 44a, which faces front cover 12, to an interior surface 44b, which faces springs 46. Carrier pins 86a, 86b (FIGS. 2 to 3c), which are described below, are provided in each of elongated slots 84a, 84b, respectively, during the assembly of damper assembly 42.

FIG. 2 shows a tool 100 configured for use in assembling damper assembly 42. Tool 100 includes a support 101 formed by first support section 102 and a second support section 104 and an actuator 106 for moving at least one of first support section 102 and second support section 104 with respect to each other. Both first support section 102 and second support section 104 are formed as concentric discs centered on a center axis 108. First support section 102 forms a radially inner disc 110 supporting first carrier pins 86a and second support section 104 forms a radially outer disc 112 supporting second carrier pins 86b. Inner disc 110 forms an inner circumference 114 of support 101 and outer disc 112 forms outer circumference 116 of support 101. Inner disc 110 includes an inner ring 118 defining inner circumference 114 and a plurality of radially extending tabs 120 extending radially outward from inner ring 118. Outer disc 112 includes an outer ring 122 defining outer circumference 116 and a plurality of radially extending tabs 124 extending radially inward from outer ring 122. Tabs 124 are positioned in circumferential spaces 126 between tabs 120 and tabs 120 are positioned in circumferential spaces 128 between tabs 124, with each of tabs 120 between two tabs 124 and each of tabs 124 being between two tabs 120. Spaces 126 are circumferentially longer than tabs 124 such that tabs 124 are circumferentially movable in spaces 126; and spaces 128 are circumferentially longer than tabs 120 such that tabs 120 are circumferentially movable in spaces 128.

Each of tabs 120 is provided with one carrier pin 86a and each of tabs 124 is provided with one carrier pin 86b. Carrier pins 86a are each provided adjacent to one circumferential edge 130 (i.e., the counterclockwise-side edge in FIG. 2) of the respective tab 120 and carrier pins 86 are provided adjacent to one circumferential edge 132 (i.e., the clockwise-side edge in FIG. 2) of the respective tab 124, such that pairs 134 of carrier pins 86a, 86b are defined adjacent to each other. In the embodiment shown in FIG. 2, tool 100 includes three pairs 134 of carrier pins 86a, 86b. Carrier pins 86a, 86b protrude axially from axially surfaces 136a, 136b of discs 110, 112, respectively.

Actuator 106 includes a first section 138 formed as a first bar 139 connected to an underside of inner disc 110 and a second section 140 formed a second bar 141 connected to an underside of outer disc 112. With respect to the view shown in FIG. 2, first section 138 and second sections 140 toward each other causes inner disc 110 and outer disc 112 to rotate and opposite directions, which causes the carrier pins 86a, 86b of each pair 134 to be moved away from each other. Each bar 139, 141 may connected to a respective pneumatic cylinder for moving the respective bar 139, 141

Figure 3A:
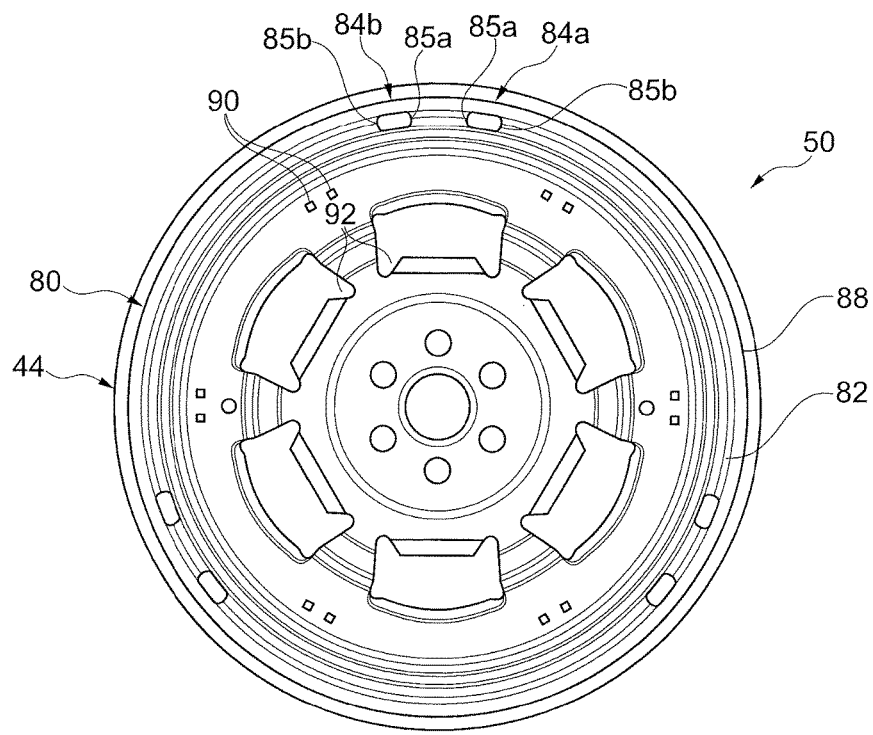
FIGS. 3a to 3c show plan views illustrating assembly of the damper assembly of the torque converter shown in FIG. 1.
Figure 3B:
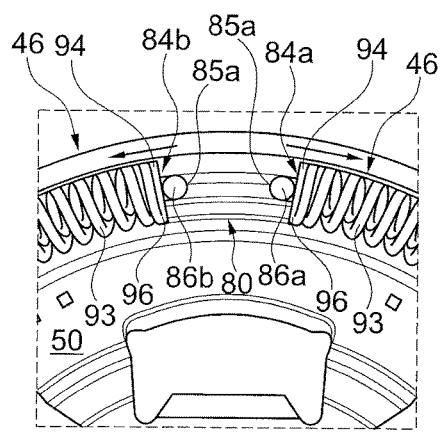
Figure 3C:
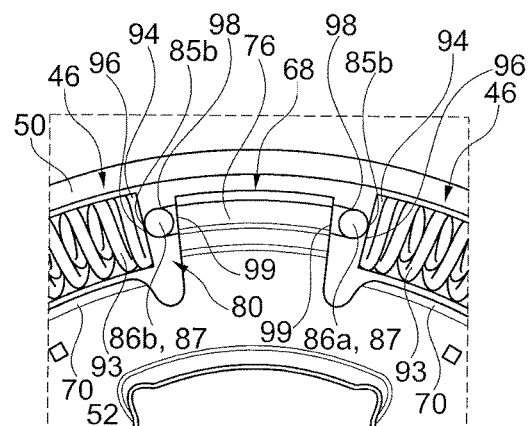

FIGS. 3a to 3c show plan views illustrating how tool 100 (FIG. 2) is used during the assembly of damper assembly 42. FIG. 3a shows a plan view of cover plate 50. As shown in FIG. 3a, spring retainer 44 defines the outer circumference of cover plate 50 and extends from axial free end 88 in an arcuate path, first radially outward and then radially inward, to form rounded radially extending section 82. Rounded radially extending section 82 includes pairs of elongated slots 84a, 84b formed therein, with each pair including one slot 84a and one slot 84b. In the embodiment shown in FIG. 3a, spring retainer 44 includes three pairs of elongated slots 84a, 84b. Each slot 84a, 84b extends circumferentially and longitudinally between a tab side edge 85a to a spring side edge 85b. In each pair of slots 84a, 84b, tab side edges 85a are closer to each other than spring side edges 85b. Radially inside of spring retainer 44, cover plate 50 includes a plurality of holes 90 for receiving rivets 62 to fix cover plate 50 to cover plate 52. Radially inside of holes 90, cover plate 50 includes circumferentially extending slots 92 for receiving springs 54.

FIG. 3b illustrates cover plate 50 being placed on top of support 101 of tool 100 shown in FIG. 2 such that carrier pins 86a, 86b of tool 100 extend axially into respective slots 84a, 84b. More specifically, FIG. 3b illustrates a portion of cover plate 50 with springs 46 in interior space 80 of spring retainer 44 and one pair 134 of carrier pins 86a, 86b. Slots 84a, 84b are also arranged in pairs, with each of the pairs of slots 84a, 84b receiving a corresponding one of the pairs 134 of carrier pins 86a, 86b. More specifically, each of the pairs of slots 84a, 84b includes a first slot 84a receiving the corresponding first carrier pin 86a and a second slot 84b receiving the corresponding second carrier pin 86b. Springs 46 each include a coil body 93 and seats 94 at longitudinal ends thereof, with seats 94 each extending into an interior of the respective spring body 93 and providing a stop surface 96 for contacting a respective carrier pin 86a, 86b. Slots 84a, 84b are circumferentially aligned with springs 46 such that slots 84a, 84b are centered at the same radial distance as springs 46 from the center axis of damper assembly 42. In the view shown in FIG. 3b, springs 46 are not preloaded, but seats 94 of springs 46 circumferentially contact carrier pins 86a, 86b as carrier pins 86a, 86b contacts tab side edges 85a of slots 84. Each spring 46 contacts one carrier pin 86a with one longitudinal end thereof and contact one carrier pin 86b with the other longitudinal edge thereof.

FIG. 3c illustrates the portion of cover plate 50 shown in FIG. 3b, but with cover plate 52 connected to cover plate 50. As shown in FIG. 3c, a respective tab 68 for the pair 134 of carrier pins 86a, 86b extends radially outward into an area circumferentially between the pair 134 of carrier pins 86a, 86b and between the two springs 46 contacting the carrier pins 86a, 86b. Tab 68 is aligned with respect to slots 84a, 84b such that circumferential edges 99 of tab 68, when viewed axially as in FIG. 3c, are each aligned with one of slots 84a, 84b, interested each slot 84a, 84b in two. In other words, each circumferential edge 99 is positioned circumferentially between edges 85a, 85b of one of slots 84a, 84b. Tab 68 is positioned circumferentially between the two sections of spring support ring 70 shown in FIG. 3c and extends radially outward past spring support ring 70. The sections of spring support ring 70 each are aligned to extend along radially inner edge 74 of the outer circumference of one of springs 46. From the view shown in FIG. 3b to the view shown in FIG. 3c, actuator 106 (FIG. 2) of tool 100 has rotated sections 102, 104 in opposite directions (or alternatively, one of sections 102, 104 is rotated) such that carrier pins 86a, 86b of each pair 134 are moved away from each other and away from tab side edges 85a and into contact with spring side edges 85b. In comparison with FIG. 3b, carrier pins 86a have been moved circumferentially away from each other and are each in contact with spring side edge 85b of the respective elongated slot 84.

Support 101 (FIG. 2) of tool 100 contacts the exterior surface 44a (FIG. 1) of spring retainer 44 and actuator 106 (FIG. 2) is used to move carrier pins 86a, 86b of a pair circumferentially away from each other from the position shown in FIG. 3b, in which carrier pins 86 contact tab side edges 85a, to the position shown in FIG. 3c, in which carrier pins 86 contact spring side edges 85b. The movement of carrier pins 86a, 8b of the pair away from each other compresses springs 46, causing springs 46 to be further compressed than in the position shown in FIG. 3b. Carrier pins 86a, 86b contact, via outer circumferences 98 thereof, stop surfaces 96 of seats 94 to compress springs 46. Thus, the contact between stop surfaces 96 and carrier pins 86a, 86b preloads springs 46.

After carrier pins 86 of the pair are moved away from each other and springs 46 are further compressed—i.e., preloaded—one tab 68 is inserted between springs 46 of each pair. Next, rivets 62 (FIG. 1) are riveted to fix cover plate 52 to cover plate 50 and to hold cover plate 52 in place. Once the riveting is completed, the damper assembly 42 is lifted up off of support 101 of tool 100 and springs 46, because springs 46 are no longer being compressed by carrier pins 86a, 8ba expand longitudinal and snap into contact with circumferential edges of 99 of tabs 68, such that springs 46 are preloaded against the circumferential edges 99 of tabs 68.

In other words, the embodiment of FIGS. 3a to 3c involves a method wherein springs 46 are provided into interior space 80 of spring retainer 44 such that springs 46 each contacts two carrier pins 86a, 8b, which circumferentially contact tab-side edges 85a of slots 84a, 84b. Next, springs 46 are compressed via the sliding of carrier pins 86a, 86b in slots 84a, 84b such that carrier pins 86 are forced against spring-side edges 85b of slots 84 and springs 46 are in a preloaded orientation. Then, tabs 68 are provided in interior space 80 of spring retainer 44 such that each of tabs 68 is between two of the carrier pins 86. Cover plate 52 is then riveted to cover plate 50. After the riveting, carrier pins 86a 86b are removed from respective slots 84a, 84b causing spring 46 to longitudinally expand and contact circumferential edges 99 of tabs 68 such that springs 46 are preloaded by tabs 68.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A damper assembly for a torque converter comprising:
   a spring retainer including an interior space holding springs; and
   tabs extending radially into spaces circumferentially between the springs and preloading the springs, the spring retainer including elongated slots extending circumferentially therein, the elongated slots being circumferentially aligned with the springs, radially outermost edges of the springs being further radially outward than the elongated slots, radially innermost edges of the springs being further radially inward than elongated slots.

2. The damper assembly as recited in claim 1 wherein the elongated slots are arranged in pairs, circumferential edges of each of the tabs each being axially aligned with the pairs of slots.

3. The damper assembly as recited in claim 1 wherein the damper assembly includes a first cover plate and second cover plate holding an additional set of springs axially therebetween radially inside of the springs held in the interior space of the spring retainer, the spring retainer being on a radially outer end of the first cover plate, the tabs being on a radially outer end of the second cover plate.

4. The damper assembly as recited in claim 3 wherein the second cover plate includes a spring support ring radially inside of the tabs positioned adjacent to the radially innermost edge of an outer circumference of each of springs held in the interior space of the spring retainer.

5. The damper assembly as recited in claim 4 wherein the spring support ring is split into a plurality of circumferentially spaced sections, with each section of the spring support ring extending along the radially innermost edge of one of the springs held in the interior space of the spring retainer.

6. A torque converter comprising:
   the damper assembly as recited in claim 1; and
   a turbine drivingly connected to the damper assembly.

7. The damper assembly as recited in claim 1 wherein the elongated slots are empty.

8. The damper assembly as recited in claim 1 wherein the elongated slots are circumferentially aligned with the springs such that the elongated slots are centered at the same radial distance as the springs from a center axis of the damper assembly.

9. The damper assembly as recited in claim 1 wherein the spring retainer extends from an axial free end in an arcuate path, first radially outward and then radially inward, to form a rounded radially extending section surrounding the springs, the elongated slots being formed in the rounded radially extending section.

10. A damper assembly for a torque converter comprising:
    a spring retainer including an interior space holding springs; and
    tabs extending radially into spaces circumferentially between the springs and preloading the springs, the spring retainer including elongated slots extending circumferentially therein, the elongated slots being circumferentially aligned with the springs, wherein the damper assembly includes a first cover plate and second cover plate holding an additional set of springs axially therebetween radially inside of the springs held in the interior space of the spring retainer, the spring retainer being on a radially outer end of the first cover plate, the tabs being on a radially outer end of the second cover plate.

11. The damper assembly as recited in claim 10 wherein the second cover plate includes a spring support ring radially inside of the tabs positioned adjacent to a radially inner edge of an outer circumference of each of springs held in the interior space of the spring retainer.

12. The damper assembly as recited in claim 11 wherein the spring support ring is split into a plurality of circumferentially spaced sections, with each section of the spring support ring extending along the radially inner edge of the outer circumference of one of the springs held in the interior space of the spring retainer.

\* \* \* \* \*